(12) United States Patent
Flynn et al.

(10) Patent No.: US 7,706,968 B2
(45) Date of Patent: Apr. 27, 2010

(54) SYSTEM AND METHOD FOR CHARACTERIZING TRAFFIC BEHAVIOR AT AN AIRPORT

(75) Inventors: Lorraine Flynn, Newton, MA (US); Mary Flynn, Newton, MA (US); James Steinberg, Melrose, MA (US)

(73) Assignee: FlightView Inc., Allston, MA (US)

( * ) Notice: Subject to any disclaimer, the term of this patent is extended or adjusted under 35 U.S.C. 154(b) by 766 days.

(21) Appl. No.: 11/432,938

(22) Filed: May 12, 2006

(65) Prior Publication Data

US 2007/0005232 A1 Jan. 4, 2007

Related U.S. Application Data

(63) Continuation of application No. 10/976,195, filed on Oct. 27, 2004, now Pat. No. 7,120,537, and a continuation-in-part of application No. 10/422,157, filed on Apr. 24, 2003, now Pat. No. 7,065,443, which is a continuation of application No. 10/027,771, filed on Dec. 20, 2001, now Pat. No. 6,580,998, which is a continuation-in-part of application No. 09/636,367, filed on Aug. 11, 2000, now Pat. No. 6,393,359.

(60) Provisional application No. 60/514,718, filed on Oct. 27, 2003, provisional application No. 60/257,497, filed on Dec. 21, 2000, provisional application No. 60/299,149, filed on Jun. 18, 2001, provisional application No. 60/171,778, filed on Dec. 22, 1999, provisional application No. 60/195,776, filed on Apr. 10, 2000.

(51) Int. Cl.
*G01C 23/00* (2006.01)

(52) U.S. Cl. .......................................... 701/120; 701/3

(58) Field of Classification Search ......... 701/120–122, 701/3, 117, 14; 342/63; 340/945, 949, 951, 340/958
See application file for complete search history.

(56) References Cited

U.S. PATENT DOCUMENTS 4,774,670 A 9/1988 Palmieri .................... 364/446

(Continued)

FOREIGN PATENT DOCUMENTS

GB 2 327 517 1/1999

(Continued)

OTHER PUBLICATIONS

Haeme, R. A., et al, Airline Performance Modelling to Support Schedule Development: An Application Case Study, *Proceedings of the 1988 Winter Simulation Conference*, Dec. 12, 1988, pp. 800-806.

(Continued)

*Primary Examiner*—Yonel Beaulieu
(74) *Attorney, Agent, or Firm*—Sunstein Kann Murphy & Timbers LLP

(57) ABSTRACT

A method is provided for characterizing traffic behavior at an airport. Scheduled and real-time flight information for the airport is obtained and used to determine, over a selected interval of time, flight delay information. The flight delay information is used to characterize an extent of delay for the airport. Various embodiments characterize traffic behavior at a plurality of distinct airports and traffic behavior of a selected airline, both at an airport and at distinct airports.

4 Claims, 3 Drawing Sheets

U.S. PATENT DOCUMENTS

| | | | | |
|---|---|---|---|---|
| 4,899,157 | A | 2/1990 | Sanford et al. | 342/40 |
| 5,051,910 | A | 9/1991 | Liden | 364/446 |
| 5,265,023 | A | 11/1993 | Sokkappa | 364/439 |
| 5,448,243 | A | 9/1995 | Bethke et al. | 342/59 |
| 6,049,754 | A | 4/2000 | Beaton et al. | 701/204 |
| 6,580,998 | B2 | 6/2003 | Flynn et al. | 701/120 |
| 7,088,264 | B2 * | 8/2006 | Riley | 340/963 |

FOREIGN PATENT DOCUMENTS

| | | |
|---|---|---|
| JP | 09205378 | 8/1997 |

OTHER PUBLICATIONS

Wieland, F., Parallel Simulation for Aviation Applications, *Proceedings of the 1988 Winter Simulation Conference*, Dec. 16, 1998, pp. 1191-1198.

Press Release: WSI Launches Flight Watch, Jun. 26, 2001, pp. 1-3.

Patent Abstract of Japan, "Traffic Information Terminal Equipment and Traffic Information Processing Method", Korea Mobil Telcommun, Corp., 1997.

Office Action dated Sep. 9, 2003 for U.S. Appl. No. 10/422,157.

Office Action dated Mar. 3, 2004 for U.S. Appl. No. 10/422,157.

Office Action dated Nov. 10, 2004 for U.S. Appl. No. 10/422,157.

Office Action dated May 27, 2005 for U.S. Appl. No. 10/422,157.

Office Action dated Oct. 28, 2005 for U.S. Appl. No. 10/422,157.

\* cited by examiner

SYSTEM AND METHOD FOR CHARACTERIZING TRAFFIC BEHAVIOR AT AN AIRPORT

CROSS REFERENCE TO RELATED APPLICATIONS

The present application is a continuation application of application Ser. No. 10/976,195, filed on Oct. 27, 2004, which claimed priority from provisional application Ser. No. 60/514,718, filed Oct. 27, 2003. The present application is also a continuation-in-part of application Ser. No. 10/422,157, filed on Apr. 24, 2003, which was a continuation of application Ser. No. 10/027,771, filed on Dec. 20, 2001 and issued as U.S. Pat. No. 6,580,998 on Jun. 17, 2003, which was a continuation-in-part of application Ser. No. 09/636,367, filed on Aug. 11, 2000 and issued as U.S. Pat. No. 6,393,359 on May 21, 2002. Application Ser. No. 10/027,771 also claimed priority from provisional application Ser. No. 60/257,497, filed on Dec. 21, 2000, and on provisional application Ser. No. 60/299,149, filed on Jun. 18, 2001. Application Ser. No. 09/636,367 claimed priority from provisional application Ser. No. 60/171,778, filed on Dec. 22, 1999, and from provisional application Ser. No. 60/195,776, filed on Apr. 10, 2000. All of the foregoing applications, which are for inventions by the present inventors, are hereby incorporated herein by reference in their entireties.

TECHNICAL FIELD

The present invention relates to a system and method for characterizing traffic behavior at an airport.

BACKGROUND

It is known in the prior art to utilize real-time flight data to estimate the landing time of aircraft that is in flight.

SUMMARY OF THE INVENTION

In a first embodiment of the invention there is provided a method of characterizing traffic behavior at an airport. In this embodiment, the method includes:
  obtaining scheduled flight information for the airport;
  obtaining real-time flight information for the airport;
  determining, in a digital computer system, over a selected interval of time, flight delay information based on the scheduled flight information and the real-time flight information; and
  using the flight delay information to characterize an extent of delay for the airport.

In a further related embodiment, there is provided a method of characterizing traffic behavior of a selected airline at the airport. In this embodiment, determining flight delay information includes doing so for the selected airline and using the flight delay information to characterize an extent of delay includes doing so for the selected airline.

The method optionally includes making the extent of delay for the airport, thus characterized, available to a user over a network. The network may be the internet, a telephone network, a special case of the latter being a wireless telephone network.

In a further related embodiment, the scheduled and real-time flight information includes departure information, and the extent of delay characterized includes delay in departure. In another related embodiment, the scheduled and real-time flight information includes arrival information, and the extent of delay characterized includes delay in arrival. In yet another embodiment, the scheduled flight information includes scheduled arrival information and scheduled departure information and real-time flight information includes real-time arrival information and real-time departure information and the extent of delay characterized is based on delay in departure and delay in arrival.

A further related embodiment optionally includes repetitively determining, over successive selected intervals of time, flight delay information based on the scheduled flight information and the real-time flight information; and using the flight delay information to characterize an extent of delay for the airport averaged over the successive selected intervals. The successive selected intervals may be daily groupings that are repeated over a selected number of days. Optionally, the daily contiguous groupings are of intervals in which the airport experiences peak demand.

In another related embodiment, there also includes repeating the processes described above for a plurality of distinct airports; and displaying in a single view the characterizations of the extent of delay for the plurality of airports. The single view may optionally be a graphical view showing the plurality of airports on a map. Optionally, the view and details of the extent of delay are made available via a downloadable web page.

In another related embodiment, there also includes repetitively determining, over successive selected intervals of time, flight delay information based on the scheduled flight information and the real-time flight information; and determining a trend, over the successive selected intervals, with respect to the extent of delay.

The above embodiments may optionally include making available to the user at least one of the following items of information: (i) a list of any flights deemed delayed according to a set of criteria, and, (ii) for at least one of such flights, a characterization of the extent of its delay (optionally its actual delay), its flight number and airline identifier, and optionally its aircraft type, or actual, scheduled or estimated departure time, (iii) its destination airport and estimated time of arrival, (iv) other flight information pertinent thereto including arrival or departure gate and (v) identification of a next segment, if any, to be followed by aircraft for the at least one of such flights, such segment's destination airport and other information as described in (ii), (iii), and (iv). Optionally this information may be made available to the user by providing a suitable hyperlink on a web page to access the information. The extent of delay may be determined on the basis of flights that have actually departed, estimates of delay for flights that have not departed, flights that have actually arrived, or estimates of delay for flights that have not yet arrived Any of the information discussed above may be made airline specific. So, as an example, in another embodiment, the invention provides a method of characterizing traffic behavior of an airline, and in this embodiment, the method includes:
  obtaining scheduled flight information for the airline;
  obtaining real-time flight information for the airline;
  determining, in a digital computer system, over a selected interval of time, flight delay information based on the scheduled flight information and the real-time flight information; and
  using the flight delay information to characterize an extent of delay for the airline with respect to the selected interval.

A computer program product implementing the foregoing methods is also provided.

In another embodiment of the invention there is provided a method of estimating, in real time, the amount of any delay, from a planned departure time, in departure of an aircraft flight from an airport. In this connection, for purposes of reference, it is considered that the aircraft belongs to a fleet (even if the fleet has only a single aircraft). Also for reference purposes, the flight is associated with a departure airport and an arrival airport. The method of this embodiment includes:

a. receiving in a first computer process a conditions input that includes at least one member of a set including departure airport conditions, arrival airport conditions, and fleet conditions; and b. estimating in a second computer process the amount of delay based on the conditions input.

(For purposes of this description and the following claims, the first and second processes can be distinct processes, or the second process may be part of the first process.)

In further related embodiments, the conditions input includes at least two members of the set (optionally all three members of the set). Additionally, estimating the amount of delay includes separately determining a delay contribution from each member of the set included in the conditions input. Under circumstances wherein the conditions input includes departure airport conditions, determining the delay contribution from the departure airport conditions may include determining, for the departure airport, the departure demand and the departure capacity.

In a further related embodiment, the departure airport conditions may include weather at the departure airport, at an applicable departure time (or time interval), and determining departure capacity at the departure airport includes evaluating a departure capacity function mapping weather conditions to capacity based on weather. The departure capacity function may be a table that is updated in real time on the basis of live air traffic data and weather condition data. In addition, determining departure demand may include accessing a flight schedule database and, optionally, live air traffic data. Also optionally, the flight schedule database may be updated in real time on the basis of live air traffic data.

Determining the delay contribution from the departure airport conditions may include evaluating a first delay function of departure demand and departure capacity to obtain a preliminary departure delay contribution. Additionally, determining the delay contribution from the departure airport conditions may include determining a recent average departure delay and evaluating a second delay function of the recent average departure delay and the preliminary departure delay contribution.

Analogous embodiments permit consideration of arrival airport conditions. Hence the conditions input may include arrival airport conditions, and determining the delay contribution from the arrival airport conditions then includes determining, for the arrival airport, the arrival demand and the arrival capacity.

In a further related embodiment, the arrival airport conditions include weather at the arrival airport, at an applicable arrival time, and determining arrival capacity at the arrival airport includes evaluating an arrival capacity function mapping weather conditions to capacity based on weather. The arrival capacity function may be a table that is updated in real time on the basis of live air traffic data and weather condition data.

In addition, determining arrival demand may include accessing a flight schedule database and, optionally, live air traffic data. The flight schedule database may be updated in real time on the basis of live air traffic data.

In related embodiments, determining the delay contribution from the arrival airport conditions includes evaluating a first delay function of arrival demand and arrival capacity to obtain a preliminary arrival delay contribution. Determining the arrival delay contribution from the arrival airport conditions may include determining a recent average arrival delay and evaluating a second delay function of the recent average arrival delay and the preliminary arrival delay contribution.

In other related embodiments, determining the delay contribution from fleet conditions includes determining when an aircraft is first likely to be available for the planned flight. In turn, determining when an aircraft is first likely to be available may include (i) accessing a flight segment database identifying, for an aircraft of the planned flight, an immediately previous flight number and departing airport; and (ii) estimating a landing time when the immediately previous flight shall have landed at the departure airport. In a further embodiment, if the landing time estimated is later by more than a threshold amount than the planned departure time, then determining when an aircraft is first likely to be available includes determining when an alternative aircraft is first likely to be available.

In another embodiment, determining the delay contribution from fleet conditions includes accessing historical fleet performance data providing historical performance of the fleet. Optionally, the historical fleet performance data include on-time performance data.

In yet another embodiment, determining the delay contribution from at least one of departure airport conditions and arrival airport conditions includes using official airport delay data. Optionally, determining the delay contribution from each of departure airport conditions and arrival airport conditions includes using official airport delay data.

In another embodiment, the invention provides a system for estimating, in real time, the amount of any delay, from a planned departure time, in departure of an aircraft flight from an airport. In this embodiment, the aircraft belongs to a fleet, the flight is associated with a departure airport and an arrival airport. The system of this embodiment includes:

a first computer process for receiving a conditions input that includes at least one member of a set including departure airport conditions, arrival airport conditions, and fleet conditions; and a second computer process for estimating the amount of delay based on the conditions input.

In a further related embodiment, (i) the conditions input includes at least two members of the set and (ii) the second computer process for estimating the amount of delay includes processes for separately determining a delay contribution from each member of the set included in the conditions input.

In another embodiment, the invention provides a digital electronic storage medium containing data correlating, with each of a series of at least three quantized weather conditions, the capacity of an airport to support departing flights. In a further related embodiment, the digital electronic storage medium contains data, correlating with each of a series of at least four quantized weather conditions, the capacity of an airport to support departing flights. Another embodiment provides a digital electronic storage medium containing data correlating, with each of a series of at least three quantized weather conditions, the capacity of an airport to support arriving flights. In a further embodiment, there is provided a digital electronic storage medium containing data, correlating with each of a series of at least four quantized weather conditions, the capacity of an airport to support arriving flights.

In yet another embodiment, there is provided a system for estimating, in real time, the amount of any delay, from a planned departure time, in departure of an aircraft flight from an airport. The system embodiment includes:

a user entry process permitting a user to generate a delay query that provides flight parameters over a communications network sufficient to determine the aircraft flight;

a delay determination process, in communication with the user entry process, that, substantially contemporaneously with the delay query, estimates a delay parameter associated with any delay in departure of the aircraft flight specified by the query; and a presentation process, in communication with the delay determination process, that presents to the user the delay parameter.

Alternatively, or in addition, the delay determination process estimates a delay parameter associated with any delay in departure of the aircraft flight specified by the query, the delay parameter being a measure of the probability of a delay in departure. The measure may be discrete or continuous. If it is discrete it may be at least bi-valued and optionally at least tri-valued.

Alternatively or in addition, the delay parameter may be an estimate of at least one of the most probable time of departure and the most probable amount of delay in departure. Also alternatively, the presentation process presents to the user delay information corresponding to the delay parameter. The delay information may be a notification delivered a specified duration before the most probable time of departure. In a further embodiment, the notification is delivered over a network and triggers an alarm.

In another embodiment of the present invention there is provided a method of deriving, as a function of weather, the capacity of an airport to handle aircraft departures and aircraft arrivals. The method of this embodiment includes:

providing historical flight data for airport, over a plurality of specified time intervals, including actual departures and actual arrivals, weather conditions, and demand for departures and demand for arrivals;

selecting occasions in such intervals when demand for departures and demand for such arrivals exceeds actual arrivals and actual departures;

quantizing weather conditions for such occasions to produce quantized data identifying weather conditions for each such occasion; and determining capacity of the airport to handle aircraft departures and aircraft arrivals from data pertinent to such occasions as a function of quantized weather values.

Optionally, capacity for departures and arrivals may instead be determined separately, in which case the above method is simplified, since the other of departures and arrivals may be ignored. Alternatively, capacity may be determined taking into account interaction between arrival and departure capacity. In a further embodiment therefore, determining capacity of the airport includes assuming, for each quantized weather value, a total capacity for departures and arrivals, such total capacity being the sum of arrival capacity and departure capacity. Optionally, assuming such total capacity further includes assuming a priority for providing arrival capacity sufficient to service arrival demand ahead of providing departure capacity sufficient to service departure demand.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Pertinent to the disclosure herein is U.S. Pat. No. 6,580,998, for a system and method for estimating aircraft flight delay, by the inventors herein; this related patent is hereby incorporated herein by reference.

Figure 1:
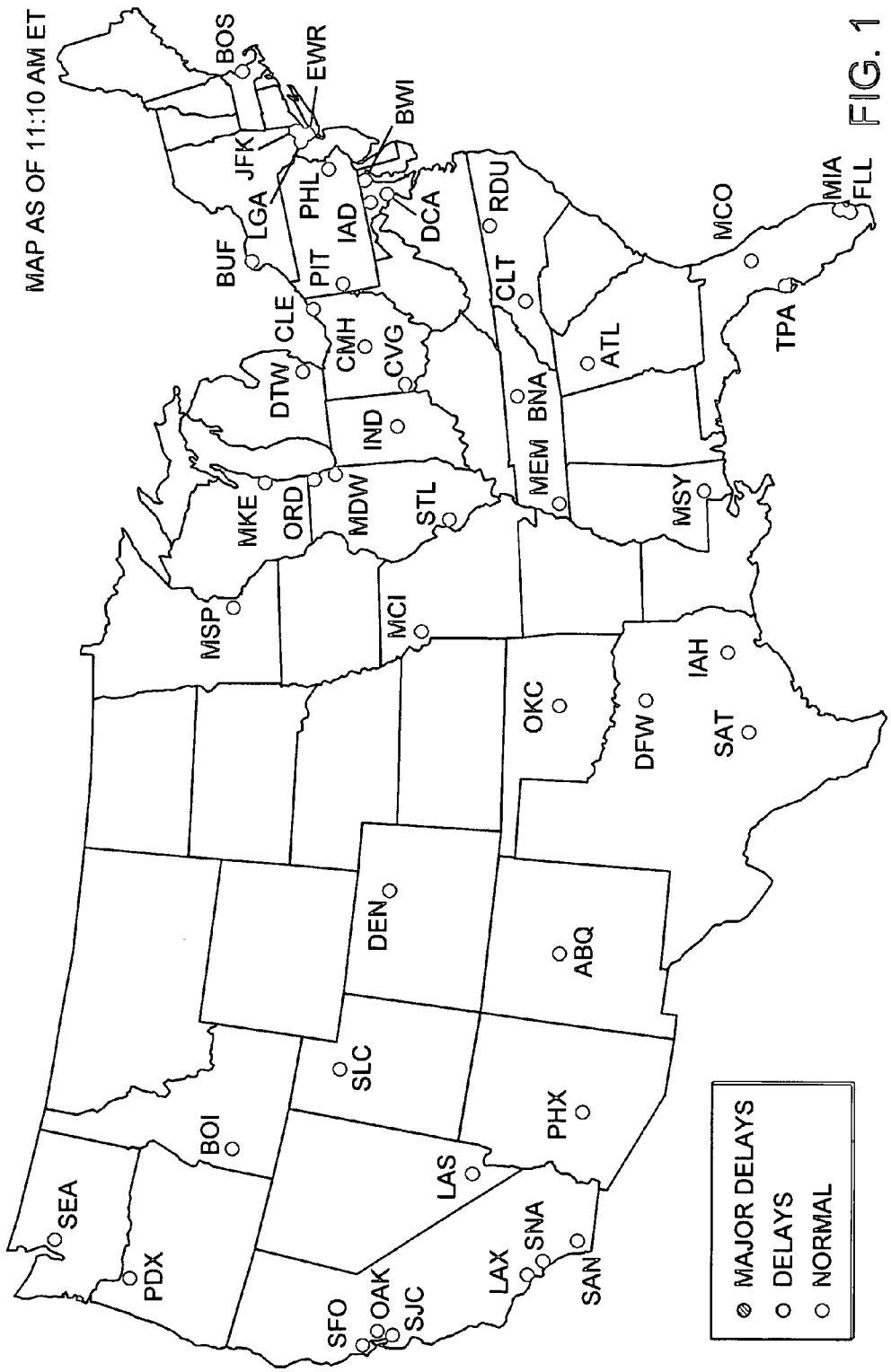
FIG. 1 is a representation, in accordance with an embodiment of the present invention, of a graphical display in the form of a map on which are shown airport locations with respect to which is present a delay characterization of the air traffic at such airport.

FIG. 1 is a representation, in accordance with an embodiment of the present invention, of a graphical display in the form of a map on which are shown airport locations with respect to which is present a delay characterization of the air traffic at such airport. The dot representing each airport is colored differently depending on whether there are conditions that are normal (i.e., substantially no delays outside normal limits) (dot is green), with delays (dot is yellow), or with major delays (dot is red).

In a further embodiment, the graphical display is presented to a user as a web page, and each airport dot is a potential hyperlink. In case delays are present at the airport in question, the user invokes the hyperlink and is provided with a web page having a format and content similar to that of Table 1 below, showing detail underlying the delay. (Here we assume the delay is a Boston's Logan airport.) The information provided to the user under these circumstances may include at least one of the following items of information: (i) a list of any flights deemed delayed according to a set of criteria, and, (ii) for at least one of such flights, a characterization of the extent of its delay (optionally its actual delay), its flight number and airline identifier, and optionally its aircraft type, or actual, scheduled or estimated departure time, (iii) its destination airport and estimated time of arrival, (iv) other flight information pertinent thereto including arrival or departure gate and (v) identification of a next segment, if any, to be followed by aircraft for the at least one of such flights, such segment's destination airport and other information as described in (ii), (iii), and (iv). In this particular example, (in order of the headings moving from left to right) we show the flight number, the departure airport, the scheduled departure, the actual departure, the delay, the destination airport, the scheduled arrival at the destination airport, and the estimated arrival at the destination airport.

Figure 2:
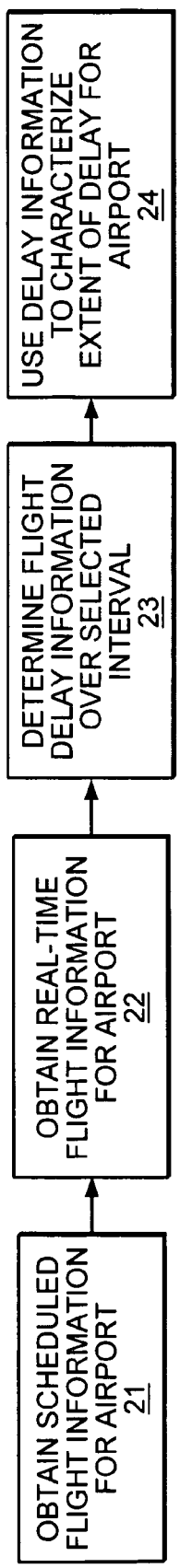
FIG. 2 is a block diagram of an embodiment of a method in accordance with the present invention.

FIG. 2 is a block diagram of an embodiment of a method in accordance with the present invention. In this method, there is obtained in process 21 scheduled flight information for the airport. In process 22, there is obtained real-time flight information for the airport (typically, in the United States, from FAA real-time data). In process 23, there is determined, over a selected interval of time (such as one, two, to three hours, for example) flight delay information based on the scheduled flight information and the real-time flight information. In process 24, the flight delay information is used to characterize an extent of delay for the airport. It will be apparent that these processes may be implemented in a digital computer system, and embodiments of the invention include a digital computer system programmed to implement the foregoing processes.

There are a variety of methods by which airport traffic delay may be determined. For example, delay in departure may be determined by examining actual departures over a selected interval, and for each actual departure determining the amount of any delay between the actual departure time and the scheduled departure time. An alternative to this approach would examine over the selected interval all scheduled departures and would use actual departure data when available (such data being available if the flight has actually departed) and would estimate delay for such flights that have not yet departed. Each method has benefits and disadvantages. The first method, while definitive with respect to delay of actually departed flights may underestimate delay, for example, if some scheduled flights have been so delayed as not yet to have departed. The second method may also underestimate delay, for example, if undeparted scheduled flights are delayed over successive intervals. A third method would combine both approaches by determining a first delay contribution with respect to flights actually departing during the interval and a second delay contribution with respect to undeparted flights scheduled to depart during the current interval and possibly previous intervals and the estimated delay is a weighted sum of these contributions.

Figure 3:
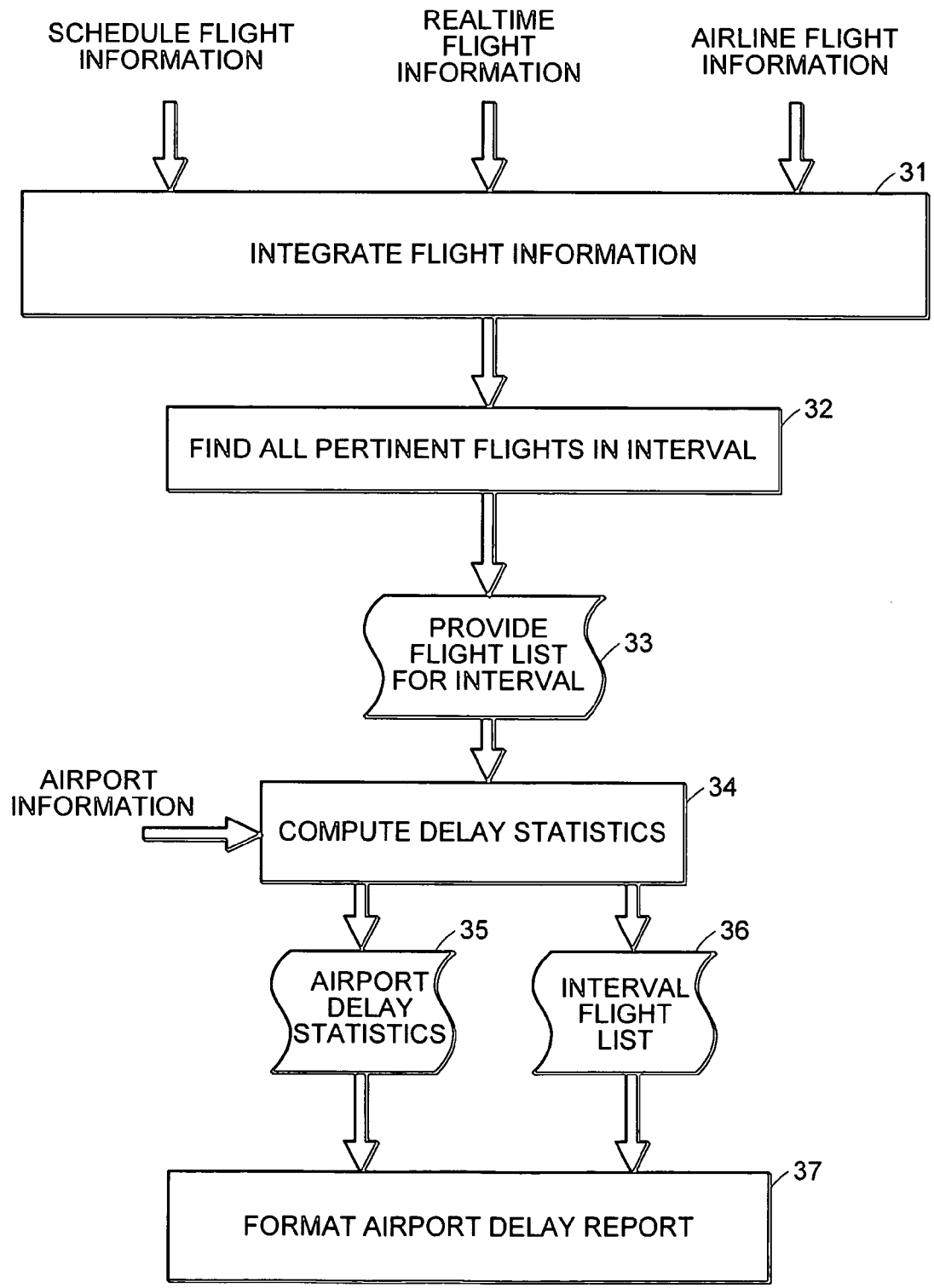
FIG. 3 is a more detailed block diagram of an implementation of the method of FIG. 2.

FIG. 3 is a more detailed block diagram of an implementation of the method of FIG. 2. In this figure, in process 31, flight information, including flight schedule information, real-time flight information, and, optionally, additional airline or flight information (such as gate information), is integrated in a database. In process 32, for a selected interval of time, there are found all flights that are pertinent to an airport of interest during the selected interval. As discussed in the previous paragraph, these flights may be (in accordance with the second method of delay determination) all flights scheduled to depart in the selected interval. (However, if the first method is used, the flights will be all flights actually departed in the selected interval, and if the third method is used, then both scheduled and departed flights in the interval will be necessary.) In process 33, there is provided the flight list data for the interval as described in process 32; this data includes data for each flight on the list, including departure and arrival information. In process 34, the information from processes 32 and 33 is used—optionally with airport information—to determine any delays associated with each scheduled flight pertinent to the interval. In process 35, there are derived, from the results of process 34, statistics characterizing the extent of delay at the airport. Also, in process 36, there is assembled, into a flight list for the interval, the data from processes 33 and 34 . In process 37 , the results of processes 35 and 36 are assembled into a report constituting delay information pertinent to the interval for the airport. The report may be furnished in a wide range of formats, including a map such as described above in connection with FIG. 1 and Table 1. A sample XML format report providing delay data is shown in Table 2.

The processes just described have been in the context of airport delay, but it will be apparent, that similar processes, limited to flights of a particular airline may be used in determining airline delay, either at a specific airport of interest or more generally with respect to a selected group of airports, including, for example, all airports serviced by the airline in the United States. In this respect process 32 of FIG. 3 can configured to provide any desired flight information for purposes of delay determination.

Although the present description has focused on the calculation of extent of delay based on departures (using actual departures or estimated future departures or both), it is also within the scope of embodiments herein to calculate extent of delay based on arrivals (either actual arrivals or estimated future arrivals or both). Similarly, extent of delay can be determined, directly or indirectly, by a function of both departure delay and arrival delay.

Below we provide, in outline form, an embodiment of the structure of software coding, using the second method for delay determination, for implementation of embodiments described above. Additional and alternative approaches for delay determination are disclosed in the applications incorporated herein by reference.

The described embodiments of the invention are intended to be merely exemplary and numerous variations and modifications will be apparent to those skilled in the art. All such variations and modifications are intended to be within the scope of the present invention as defined in the appended claims.

Outline of Software Coding for Process for Delay Determination

Build and maintain database of integrated flight schedule information and real time flight information, and airline-provided flight information. Optionally, build and maintain a database of airport specific factors, such as taxi in and taxi out times.

```
At the beginning of each interval (say, once every 15 minutes)
    T1 = Now − X (say, 15 minutes)
    T0 = T1 − Y (Y is the selected interval; say, two hours)
    For each airport:
    From the above database, get list of flights (FlightList) departing
    (arriving) the airport whose scheduled departure (arrival) time is in the
    interval (T0-T1). Each flight record in FlightList typically has at least
    the following information:
            Flight number
            Departure airport
            Arrival airport
            Scheduled departure time
            Scheduled arrival time
            Actual departure time
            Actual arrival time
            FlightDelay (computed in algorithm)
        I is an index into FlightList
        For each flight (I) in FlightList:
            If the flight has departed (arrived)
        Then FlightDelay[I] =
            CalculateDelay( Actual departure (arrival) time,Scheduled
            departure (arrival) time) (this is subtraction)
            Else FlightDelay[I] = CalculateDelay( T1,Scheduled departure
            (arrival) time) (use subtraction and add quantity to estimate
            additional delay of not yet departed flight)
            Increment index, I=I+1
    Calculate Airport Delay Statistics
        From the above FlightDelay list:
            Calculate the mean of the flight delays
            Calculate the standard deviation of the flight delays
            Calculate the value of the Outlier delay (say mean+1.75* stan-
    dard deviation)
    Determine Delayed Flight List
            J=0
            K=0
        For each flight in the above FlightList, indexed by I:
            If FlightDelay[I] < X (say 15 minutes)
                Then OntimeFlight[J] = Flight[I] from the
                FlightList, increment J
                Else if FlightDelay[I] <Outlier delay
                Then LateFlight[K]] = Flight[I] from the FlightList,
    increment K
                Else do not use this flight's delay value (too extreme)
    Recompute Airport Delay Statistics
        From the above LateFlight list:
            Calculate the mean of the flight delays
            Calculate the standard deviation of the flight delays
    Compute Histogram of Flight Delays
        For each flight in the above FlightList, indexed by I (Optionally may
        remove outliers by using only FlightDelay from flights in OntimeFlight
        and LateFlight Lists):
            K = FlightDelay[I]/BinInterval (say 15 (minutes) )
            HistogramBin[K] = HistogramBin[K]+1
            Compute Delay Characteristic of Airport
```

-continued

```
         Green = HistogramBin[0]+HistogramBin[1], say
         Yellow = HistogramBin[2]+HistogramBin[3] ]+
         HistogramBin[4]
]+HistogramBin[5], say
         Red = HistogramBin[6]+HistogramBin[7]....,say
```

Export this information (including on-time list, delay flight list, histogram, and delay characteristic) for presentation, display.

TABLE 1

DEPARTURE DELAY REPORT
Boston Logan International Airport (BOS)
Oct. 24, 2003 - 15:18
14:00 to 15:00

| Flight | Airport | Sched-uled | Ac-tual | Delay | Airport | Sched-uled | Esti-mated |
|---|---|---|---|---|---|---|---|
| AA1591 | BOS | 13:26 | 14:07 | 41 | DFW | 14:56 | 15:03 |
| AA2355 | BOS | 13:42 | 14:34 | 52 | STL | 15:10 | 15:56 |
| AA4806 | BOS | 14:11 | | 67 | JFK | 14:57 | |
| CO8648 | BOS | 13:14 | 14:02 | 46 | HPN | 14:00 | 14:36 |
| DL2523 | BOS | 14:22 | 14:53 | 31 | TPA | 16:58 | 17:22 |
| DL6189 | BOS | 14:23 | 14:25 | 0 | PHL | 15:32 | 15:30 |
| HP29 | BOS | 13:50 | 14:18 | 28 | PHX | 17:01 | 17:15 |
| UA193 | BOS | 14:36 | 14:42 | 0 | IAD | 15:45 | 15:51 |
| UA531 | BOS | 14:25 | 14:48 | 23 | ORD | 15:32 | 15:41 |
| US2029 | BOS | 14:15 | 14:48 | 33 | DCA | 15:30 | 15:47 |

TABLE 2

Sample XML feed of delays

```
- <AirportDelayResult>
  - <ProcessingStamp>
    - <DateTime>
        <Date>2003-10-22</Date>
        <Time>18:08:51</Time>
        <UTC />
      </DateTime>
    - <Server>
        <Host>Ink</Host>
      - <AirportDelayGenerator>
          <Name>AirportDelay.exe</Name>
          <Version>0.0.0.1</Version>
        </AirportDelayGenerator>
      </Server>
    </ProcessingStamp>
  - <AirportDelay>
    - <Airport>
      - <AirportId>
          <AirportCode>ORD</AirportCode>
          <IATACode />
        </AirportId>
      </Airport>
    - <Distribution>
      - <Grouping>
          <Name>On Time</Name>
          <MaxDelay>15</MaxDelay>
          <Count>105</Count>
        </Grouping>
      - <Grouping>
          <Name>Late</Name>
          <MinDelay>15</MinDelay>
          <MaxDelay>60</MaxDelay>
          <Count>29</Count>
        </Grouping>
      - <Grouping>
          <Name>Very Late</Name>
          <MinDelay>60</MinDelay>
          <Count>2</Count>
        </Grouping>
      </Distribution>
    - <Details>
        <Delaykind>Departure Delays</DelayKind>
        <AverageDelay>10.67</AverageDelay>
        <AverageDelay excludeGrouping="On Time">23.15</AverageDelay>
        <DelayStandardDeviation excludeGrouping="On Time">5.55</DelayStandardDeviation>
      </Details>
    </AirportDelay>
```

We claim:

1. A computer program product to be executed by a computer, the computer program product comprising a computer usable medium having computer readable program code thereon, the computer readable program code comprising:
   program code for correlating, with each of a series of at least three quantized weather conditions, the capacity of an airport to support departing flights; and
   program code for calculating the capacity of an airport to support departing flights based on the correlation.

2. A computer program product according to claim 1 containing program code for correlating, with each of a series of at least four quantized weather conditions, the capacity of an airport to support departing flights.

3. A computer program product to be executed by a computer, the computer program product comprising a computer usable medium having computer readable program code thereon, the computer readable program code comprising:
   program code for correlating, with each of a series of at least three quantized weather conditions, the capacity of an airport to support arriving flights.

4. A computer program product according to claim 3 containing program code for correlating, with each of a series of at least four quantized weather conditions, the capacity of an airport to support arriving flights.

* * * * *